United States Patent [19]
Kato et al.

[11] Patent Number: 5,109,312
[45] Date of Patent: Apr. 28, 1992

[54] MAGNETIC RECORDING APPARATUS AND MAGNETIC HEAD WITH SUPERCONDUCTING MATERIAL

[75] Inventors: Takahiko Kato, Katsuta; Jiro Kuniya, Hitachi; Takao Imagawa, Sendai; Katsuzo Aihara, Hitachiota, all of Japan

[73] Assignee: Hitachi, Ltd., Tokyo, Japan

[21] Appl. No.: 495,095

[22] Filed: Mar. 19, 1990

[30] Foreign Application Priority Data

Mar. 20, 1989 [JP] Japan .................................. 1-66226
Jan. 17, 1990 [JP] Japan .................................. 2-6124

[51] Int. Cl.$^5$ ..................... G11B 5/147; G11B 5/133; G11B 5/55; H04B 3/28
[52] U.S. Cl. .................................... 360/126; 360/125; 360/106; 505/872; 505/701; 505/1
[58] Field of Search ............... 360/126, 106, 125; 505/1, 800, 872, 701

[56] References Cited

U.S. PATENT DOCUMENTS

| | | | |
|---|---|---|---|
| 4,907,115 | 3/1990 | Ruigrok et al. | 360/126 |
| 4,926,082 | 5/1990 | Barnes | 360/106 |
| 4,927,804 | 5/1990 | Zieren et al. | 360/126 |
| 4,935,403 | 6/1990 | Yamaoki et al. | 346/74.2 |
| 4,937,227 | 6/1990 | Enz et al. | 360/126 |
| 4,971,947 | 11/1990 | Barnes et al. | 360/125 |
| 4,979,064 | 12/1990 | Mage et al. | 360/125 |

FOREIGN PATENT DOCUMENTS

64-1139  5/1989  Japan .

Primary Examiner—John H. Wolff
Assistant Examiner—Craig A. Renner
Attorney, Agent, or Firm—Antonelli, Terry, Stout & Kraus

[57] ABSTRACT

A magnetic recording apparatus with a magnetic head, superconductive layers formed over at least flux generating surfaces of the magnetic head and normal conductive regions of small size for passing the flux provided in the superconductive layers, over the flux generating surfaces, so as not to form a closed magnetic circuit so as to enable reversible spontaneous magnetization in a magnetic recording medium proximate thereto. The minimum unit size (recording wavelength) of the reversible spontaneous magnetization in magnetic recording of the magnetic recording medium can be reduced from the order of 1 $\mu$m to that of 0.1 $\mu$m. Thus it is possible to increase the surface recording density of the magnetic recording medium utilizing more than 100 Mb/in$^2$, comparable to the density achieved by the opto-magnetic recording. This in turn makes it possible to provide a large disc apparatus having a capacity of 60 MB or more.

14 Claims, 7 Drawing Sheets

MAGNETIC RECORDING APPARATUS AND MAGNETIC HEAD WITH SUPERCONDUCTING MATERIAL

BACKGROUND OF THE INVENTION

1. Field of the Invention

This invention relates to a novel magnetic recording apparatus and a magnetic head used therein.

2. Description of the Prior Art

The technique of recording electric signals on a magnetic recording medium in the form of residual magnetism is now in progress along with the development of recording mediums such as magnetic tapes and magnetic discs. The apparatuses using these recording mediums are largely classified into a magnetic recording apparatus and an opto-magnetic recording apparatus according to the recording method employed. The magnetic recording is accomplished by applying a magnetic field by means of a magnetic head to a narrow region of the recording medium where the temperature is lower than the Curie point and forcibly reversing the positive and negative polarities of the spontaneous magnetization inherent in a ferromagnetic material. The opto-magnetic recording on the other hand is done by radiating a beam of light such as laser onto a narrow region on a ferromagnetic material to raise the temperature of that region above the Curie point and thereby reverse the spontaneous magnetization. Another method is also used in which a weak magnetic field is applied in addition to the laser beam to assist the reversal of the spontaneous magnetization. These recording methods differ in the recording density and the recording and playback speeds. As to the recording density, because one reversed region of spontaneous magnetization constitutes the unit of recording, the recording density depends on the size of the reversed region. The smaller the reversed region, the greater the recording density will become. The size of the reversed region in the magnetic recording is determined by the spreading of the flux generated by the magnetic head. The size of the reversed region in the opto-magnetic recording is determined by an extent to which the irradiated laser beam is focused. The currently available technology reduces the size of the reversed region in the opto-magnetic recording to the order of 0.1 $\mu$m, about one order smaller than the reversed region size in the magnetic recording. This means that the recording density for the opto-magnetic recording is significantly higher than for the magnetic recording. The recording and playback speed depends on the reversing speed of the spontaneous magnetization and the moving speed of the magnetic head or the light irradiation head. Since the magnetic recording has higher reversing speed and head moving speed than the opto-magnetic recording, the magnetic recording is remarkably advantageous over the opto-magnetic recording in terms of the recording and playback speed.

JP-A-63-259808 and JP-A-63-313305 disclose that magnetic recording of high density is effected by surrounding magnetic poles of the magnetic head with a superconductive material of oxide system to prevent leakage of flux from the sides of the magnetic poles and spreading of flux in a space at the front ends of the magnetic poles. However, this method does not recognize the fact that the flux does not pass through the inside of the superconductive material surrounding the magnetic poles. Accordingly, if the flux is forcibly passed through the inside of the superconductive material, an eddy current is caused to flow in the superconductive material provided around the magnetic poles to impede the passage of the flux and the superconductive material loses its superconductive characteristics. As a result, the effect of preventing the spreading and leakage of the flux cannot be obtained.

SUMMARY OF THE INVENTION

The abovementioned conventional technique has a drawback that either the recording density or the recording and playback speed is small. An object of this invention is to provide a magnetic recording apparatus which has a high recording density and a high recording and playback speed and in which the recording density is improved to a level equal to that of the opto-magnetic recording, and a magnetic head used in the apparatus.

According to an aspect of the invention, there is provided a magnetic recording apparatus having a magnetic head wherein superconductive layers are formed over at least the front ends of flux generating portions of magnetic poles of the magnetic head so as to be positioned in parallel with the flux generating surfaces, normal conductive regions for passing the flux generated from the magnetic poles are provided in planar configuration in the superconductive layers so as not to form a closed magnetic path, the normal conductive regions provided in the superconductive layers being formed into a slit shape in planar configuration, and the width of the slit is made to be smaller than that of the flux generating surfaces at the front ends of the magnetic poles.

The magnetic recording apparatus or the magnetic head in an embodiment of the invention is provided with the superconductive layers and therefore comprises cooling means for forcibly cooling the layers to below a critical temperature.

According to another aspect of the invention, there is provided a magnetic disc apparatus comprising a magnetic disc having a magnetic recording medium, a thin-film magnetic head to record information in or reproduce it from the magnetic recording medium, and a carriage to move the thin-film magnetic head to a specified position on the magnetic disc, characterized in that the thin-film magnetic head has superconductive layers arranged over at least the front ends of flux generating portions of magnetic poles constituting the magnetic head in parallel with the flux generating surfaces, normal conductive windows are provided in planar configuration in the superconductive layers, for passing the flux in an area narrower than the flux generating surfaces of the magnetic poles of the magnetic head, and cooling means is provided for forcibly cooling the superconductive layers.

Further, the magnetic disc apparatus according to an embodiment of the invention is characterized in that the thin-film magnetic head has a recording wavelength of the order of submicron, less than one-tenth of the recording track width, and a surface recording density of more than 100 Mb/in$^2$ and the apparatus has a capacity of more than 60 MB.

According to still another aspect of the invention, there is provided a magnetic head forming a magnetic circuit through a magnetic gap, characterized in that superconductive layers are formed over at least the flux generating surfaces of the magnetic head in parallel with the flux generating surfaces, and windows of normal conductive regions are provided in the superconductive layers, for passing the flux in an area narrower than the flux generating surfaces of the magnetic poles of the magnetic head. Further, the magnetic head of the invention is characterized by the provision of normal conductive regions for passing the flux having a width smaller than a thickness of the magnetic poles defining the magnetic gap therebetween and a slit shape in parallel with the magnetic gap, or by the provision of normal conductive regions for passing the flux formed over magnetic films of the flux generating surfaces and having a width smaller than that of the magnetic films and a slit shape crossing the magnetic gap.

The aforementioned slit-shaped, normal conductive window for flux passage provided in the superconductive layer is not always required to be located at a central portion of the flux generating surface of the magnetic pole.

According to the invention, there is provided a thin-film magnetic head having an upper magnetic pole and a lower magnetic pole or lower soft magnetic layer which are opposed to each other with a magnetic gap therebetween to form a magnetic circuit, characterized in that superconductive layers are formed over at least the front ends of flux generating portions of magnetic poles constituting the magnetic head in parallel with the flux generating surfaces, and normal conductive windows are provided in the superconductive layers, for passing the flux in an area smaller than the flux generating surfaces of the magnetic poles of the magnetic head.

In an embodiment of the invention, the window of normal conductive region for passage of flux provided in the superconductive layer over the magnetic pole front end of the magnetic head and having a slit shape can be prepared easily by radiating a laser beam, or an ion or electron beam on a specified portion of the superconductive layer. In addition, the window may become insulative under the irradiation and may be formed by removing a slit-shaped portion for passage of flux under radiation of, for example, a laser beam on the given portion of the superconductive layer. However, the window prepared by these methods is not isolated in the superconductive layer but is required to be formed into a so-called slit shape that runs from one end of the superconductive layer to the other. Further, by radiating oxygen ions on the superconductive layer, the Jc value can be improved.

A film of the superconductive layer may be formed of an oxide but even a normal conductive layer may be formed into the superconductive layer, excepting the slit-shaped normal conductive region, by thermally treating the same under the radiation of ions or of an electromagnetic radiation such as a laser or electron beam.

As for ions to be radiated, oxygen is effective for superconductivity to normal conductivity conversion or vice versa but it is possible to convert superconductivity into normal conductivity by using other ions of hydrogen or various metals.

An embodiment of the invention is characterized in that information magnetically recorded on a magnetic medium by reversing spontaneous magnetization in a magnetic layer stacked on a non-magnetic substrate is converted into a weak electric signal by means of a coil formed of superconductor that is located close to a reversed spontaneous magnetization portion, and the weak electric signal is sent to another coil which converts it into magnetic field, which is finally taken up by a quantum phase interference metering ring to make magnetic measurement of the reversed spontaneous magnetization portion.

This invention is further characterized in that the information reading is performed by a quantum phase interference metering ring connected to the quantum phase interference meter or by a superconductor pickup coil connected to that meter, because the magnetic recording portion can be minimized, which will make it difficult for the conventional magnetic head to read the recorded information.

BRIEF DESCRIPTION 0( THE DRAWINGS

DESCRIPTION OF THE PREFERRED EMBODIMENTS

In an embodiment of the invention, the magnetic flux from the magnetic head used to reverse the spontaneous magnetization of the recording portion on the magnetic recording medium is passed through a small normal conductive region provided in the superconductor to minimize its spreading, thus realizing a high-density recording.

Figure 1:
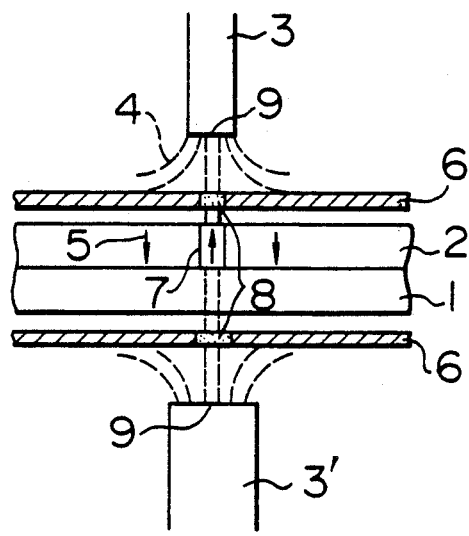
FIG. 1 is a schematic cross section showing the method of magnetic recording according to this invention.

FIG. 1 is a cross section showing the principle of this invention. This method is such that in the magnetic recording process performed by generating a flux 4 by a main magnetic pole 3 of a magnetic head and passing it through a magnetic film 2 laminated on a non-magnetic substrate 1 to reverse spontaneous magnetization 5 in the magnetic layer 2, the magnetic layer 2 is covered with a superconductive layer 6 and a portion 8 of the superconductive layer covering the magnetic recording portion 7 is rendered normally conductive in advance to permit part of flux to pass through the portion 8. In this case, the normal conductive portion can be formed by causing the superconductor to collapse precedently under the radiation of a laser beam, or an electromagnetic radiation such as an ion or electron beam to change it into an insulator or normal conductor, thereby providing a magnetic head capable of restricting spreading of the flux generated from the magnetic head. Denoted by 3' is an auxiliary magnetic pole. The main magnetic pole 3 has a pole piece and the information recording is performed by a coil wound on the pole piece.

Figure 2:
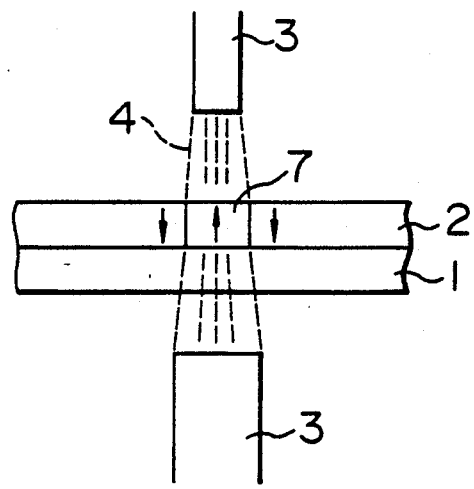
FIG. 2 is a schematic cross section showing the conventional method of magnetic recording.

FIG. 2 shows a conventional magnetic recording method. In the conventional method, the size of a recording portion 7 depends directly on the spreading of flux 4 generated by magnetic poles 3. The minimum spreading of the flux is one order or more larger than the diameter of the laser beam. This is the major cause for the fact that the recording density of the magnetic recording is considerably lower than that of the opto-magnetic recording using the laser beam. This invention, however, has achieved a method of reducing the spreading of the flux to that comparable to the laser beam diameter by using the superconductor. More particularly, in FIG. 1, the magnetic flux 4 generated by the magnetic poles 3 of the magnetic head cannot enter the magnetic layer 2 when the superconductive layer 6 is provided between the magnetic pole 3 and the magnetic layer 2. This is due to the Meissner effect in which the substance in the superconductive state blocks the magnetic flux. However, in this invention, under the radiation of an electromagnetic radiation onto the superconductive portion 8 covering the magnetic recording portion 7, the superconductive state of that portion collapses and turns into normal conductive state in advance. Accordingly, part of the flux 4 passes through the normal conductive portion 8, reversing the spontaneous magnetization of the magnetic layer 2 to magnetically record information. The diameter of the flux passing through the normal conductive portion 8 is constricted to the size equivalent to or smaller than the width of the normal conductive portion 8. In the present invention, by making the width of the normal conductive portion 8 smaller than that of the magnetic flux generating surface 9 of the magnetic pole 3, the size of the magnetic recording portion 7 can be made to be as small as the width of the normal conductive portion 8. Because of this, the recording density in the magnetic recording according to this invention can be increased so as to be equivalent to that in the opto-magnetic recording. The normal conductive portion 8 is formed into a slit shape extending in a direction perpendicular to the plane of the drawing sheet in order to allow passing or blocking of the flux generated by the magnetic poles 3.

Preferably, the superconductive layer used in the invention may be made of an oxide exhibiting superconductive characteristics at a temperature above 77K of liquid nitrogen temperature. Examples of the oxide and their critical temperatures are shown in Table 1. Liquid nitrogen can be used as cooling medium for these oxides and a cooling mechanism can be simplified remarkably and can be reduced in weight. Oxides exhibiting superconductive characteristics at higher temperatures than that of liquid nitrogen are preferable, and oxides exhibiting superconductivity around normal temperature do not require cooling and are the most preferable.

The oxide superconductive layer preferably has a thickness of 0.1 to 10 μm and may be formed through, for example, ion sputtering process, evaporation process or CVD process. Especially, for the thin-film magnetic head, the thickness may preferably be smaller than that of the magnetic film, thus amounting to 0.1 to 5 μm. When the slit of the normal conductive region is in parallel to the magnetic gap, its width may preferably be smaller than the thickness of the magnetic film, thus amounting to 0.1 to 5 μm. When the slit crosses the magnetic gap, its width may preferably be 5 to 20 μm.

TABLE 1

| | Superconductive Oxides | Critical temp. (K.) |
|---|---|---|
| 1 | $Ba_2LnCu_3O_7$ (where Ln = Y and rare earth elements; excepting Ce, Pr, Tb) | 94 |
| 2 | $Ba_4Ln_2Cu_8O_{16}$ (where Ln = Y and rare earth elements; excepting Ce, Pr, Tb) | 90 |
| 3 | $Ba_4Ln_2Cu_7O_{15}$ (where Ln = Y and rare earth elements; excepting Ce, Pr, Tb) | 85 |
| 4 | $Bi_2Sr_2CaCu_2O_8$ | 80 |
| 5 | $Bi_2Sr_2Ca_2Cu_3O_{10}$ | 110 |
| 6 | $Tl_2Ba_2CuO_6$ | 80 |
| 7 | $Tl_2Ba_2CaCu_2O_8$ | 110 |
| 8 | $Tl_2Ba_2Ca_2Cu_3O_{10}$ | 125 |
| 9 | $TlBa_2CaCu_2O_7$ | 80 |
| 10 | $TlBa_2Ca_2Cu_3O_9$ | 110 |
| 11 | $TlBa_2Ca_3Cu_4O_{11}$ | 122 |
| 12 | $TlBa_2Ca_4Cu_5O_{13}$ | 120 |
| 13 | $TlSr_2Ca_2Cu_3O_9$ | 100 |

According to the invention, the size of minimum unit of the reversed spontaneous magnetization portion (recording wavelength) in the magnetic recording can be reduced from the conventional 1 μm order to the 0.1 μm order of submicron. Therefore, in the present invention, the surface recording density in magnetic recording can be increased to 100 Mb/in$^2$ or more comparable to that of the opto-magnetic recording, thereby attaining beneficial effects that a large-size disc apparatus having an apparatus capacity of 60 MB or more can be obtained.

EMBODIMENTS

Embodiment 1

Figure 3:
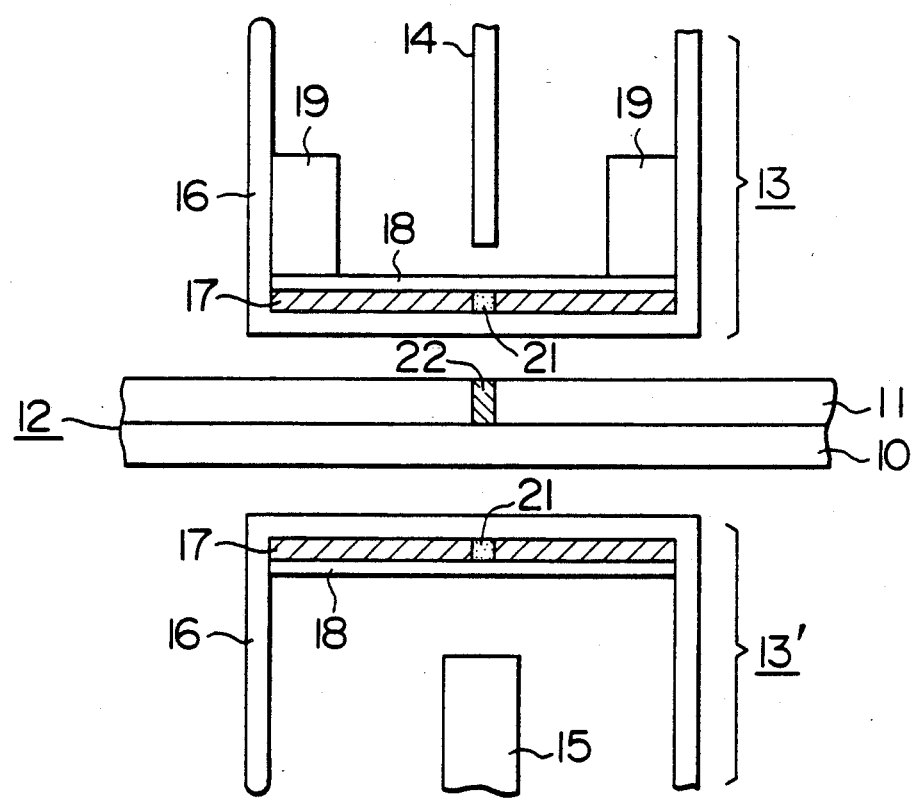
FIGS. 3 and 4 are cross sections showing examples of the apparatus of the invention.

FIG. 3 is a cross section showing a magnetic recording portion in a magnetic recording apparatus according to the invention. A disc 12, comprised of a non-magnetic substrate 10 and a magnetic layer 11 which is laminated over the non-magnetic substrate 10 and which has spontaneous magnetization, is interposed between magnetic field generating systems 13, 13'. The field generating systems 13, 13' have a main magnetic pole 14 installed on the magnetic layer 11 side and an auxiliary magnetic pole 15 installed on the other side, respectively. Provided over the front ends of the respective magnetic poles 14 and 15 are superconductive layers 17 which are formed on non-magnetic frames 16 through ion sputtering process, the superconductive layer having a film thickness of about 1 μm and a composition of $YBa_2Cu_3O_7$.

The oxide superconductive layer 17 is formed by depositing $SrTiO_3$ of perovskite crystal to a thickness of 0.1 μm through ion-sputtering, radiating a laser beam on a thus formed film to maintain it at a temperature of 450° to 650° C., and depositing on a resulting film a superconductive oxide of $YBa_2Cu_3O_7$ to a thickness of 1 μm trough RF magnetron sputtering process. This sputtering is carried out in pure oxygen ($\sim 1 \times 10^{-3}$ Torr) at 100 W and an oxide of single $YBa_2Cu_4O_x$ is used as a target. The distance between the target and the film forming plane is about 70 mm. The thus obtained superconductive layer 17 had zero electrical resistance at a temperature of 90K.

A soft magnetic member 19 is provided around the main magnetic pole 14. Portions 21 on a line connecting the magnetic poles 14 and 15 are rendered normally conductive or insulative in advance under radiation of an elertromagnetic radiation to form slit-shaped windows for flux. It has been found that as the electromagnetic radiation, any of laser, electron and ion beams can be used. This window is formed into a slit shape having a width of submicron and the non-superconductive portion 21 is so formed as not to be enclosed by the superconductive film. Each superconductive layer 17 together with the non-superconductive portion 21 is covered with a non-superconductive protection film 18. The protection film 18 is adapted to prevent environmental degradation of superconductive layer 17 such as due to water adsorption and preferably, may be non-magnetic, insulative and thermally highly conductive. In this embodiment, a 0.1 $\mu$m thick protection film of amorphous MgO was formed by ion-sputtering. The soft magnetic member 19 is arranged around the main magnetic pole but this soft magnetic member is provided in this embodiment for the purpose of being used to control the density of flux and even without the provision, the effects of the present invention will not be lost. Part of flux generated from the main magnetic pole 14 passes through the non-superconductive portion 21 to reverse spontaneous magnetization in a small region 22 of the magnetic layer 11 and reaches the auxiliary magnetic pole 15. When magnetic recording at different locations on the magnetic layer 11 is to be effected, magnetic recording can be done sequentially at small areas by repeating the operation of stopping the generation of flux from the magnetic pole 14 and moving the disc 12 or the field generating systems.

Even with the above-described disc 12 exchanged with a magnetic tape (constructed of a magnetic recording layer 11 and a base film 10), magnetic recording onto the magnetic tape can be achieved with a similar apparatus construction and pursuant to a similar operational principle.

As described previously, the oxide system material is used for the superconductor 17 and if exhibiting superconductivity at normal temperature, it can be used without special cooling. If superconductivity is exhibited at lower temperatures, forcible cooling is needed. Accordingly, in the present embodiment, the field generating system 13 is provided with cooling means. Used as coolant is liquid nitrogen, liquid carbonic acid gas or the like.

Embodiment 2

Figure 4:
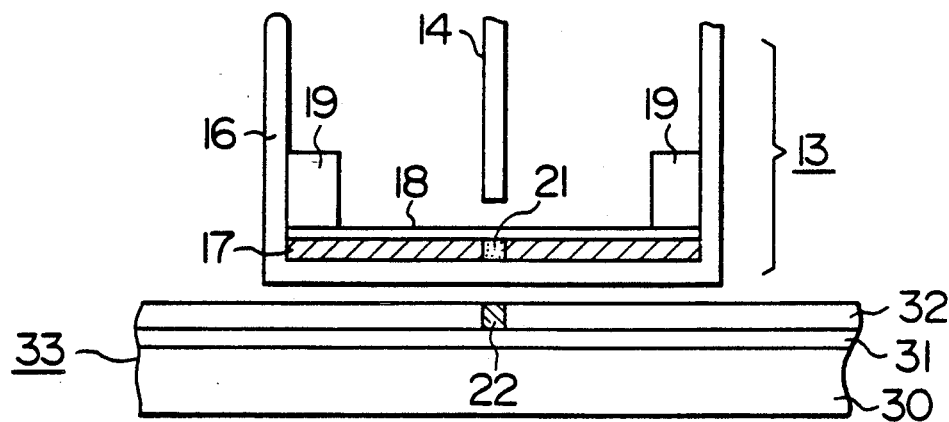

FIG. 4 is a cross section showing the configuration of a magnetic recording apparatus according to this invention. A disc 33 is comprised of a non-magnetic substrate 30, a soft magnetic layer 31 stacked upon the substrate 30, and a magnetic layer 32 stacked upon the soft magnetic layer 31, the magnetic layer 32 having spontaneous magnetization. A magnetic field generating system 13 similar to the one used in the embodiment 1 is installed on the magnetic layer side to constitute the apparatus. Superconductors 17 may be formed as in embodiment 1. Part of flux generated from a main magnetic pole 14 passes through a non-superconductive portion 21 to reverse spontaneous magnetization in a small region 22 of a magnetic layer 11 and reaches the soft magnetic layer 31. As in the case of embodiment 1, the non-superconductive portion 21 has a width of submicron and is formed into a slit shape so as not to be enclosed by the superconductor 17. When magnetic recording at different locations on the magnetic layer 32 is to be effected, magnetic recording can be done sequentially at small areas by repeating the operation of stopping the generation of flux from the magnetic pole 11 and moving the disc 33 or the field generating system 13.

Even with the aforementioned disc 33 replaced with a magnetic tape (corresponding to the structure constructed of the magnetic recording layer 11, soft magnetic layer 31 and base film 30 in FIG. 4), magnetic recording onto the magnetic tape could be achieved with a similar apparatus construction and by a similar operational principle. The superconductor 17 is also similar to the one described previously.

Embodiment 3

Figure 5:
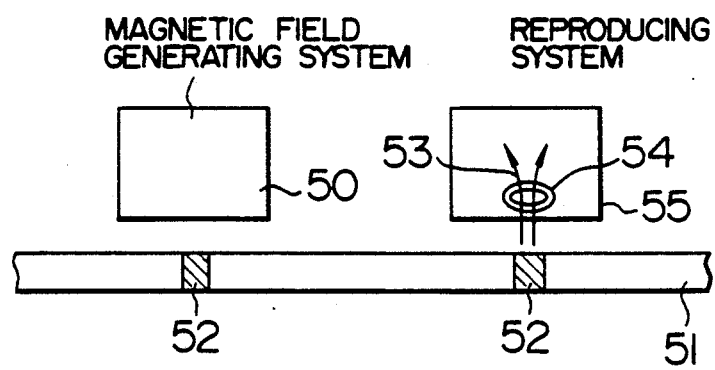
FIG. 5 is a schematic cross section showing the method of reproduction according to the invention.

FIG. 5 is a schematic diagram showing the principle of reproducing signals from the recorded magnetic layer. The recording density in the magnetic layer as recorded by using the embodiment 1 or 2 is one order higher than that obtained by the conventional magnetic recording and comparable to the recording density by the opto-magnetic recording. Thus, it is difficult to read and reproduce the recorded information by using the conventional magnetic head. To eliminate this problem, a reproducing system 55 is used, in which spontaneous magnetization 53 in a portion 52 of magnetic layer 51 that is recorded with information by a field generating system 50 similar to the one 13 or 13' used in the embodiments 1 and 2, is sensed by a field measuring device that employs a quantum phase interference metering ring 54 and then converted into an electric signal.

Figure 6:
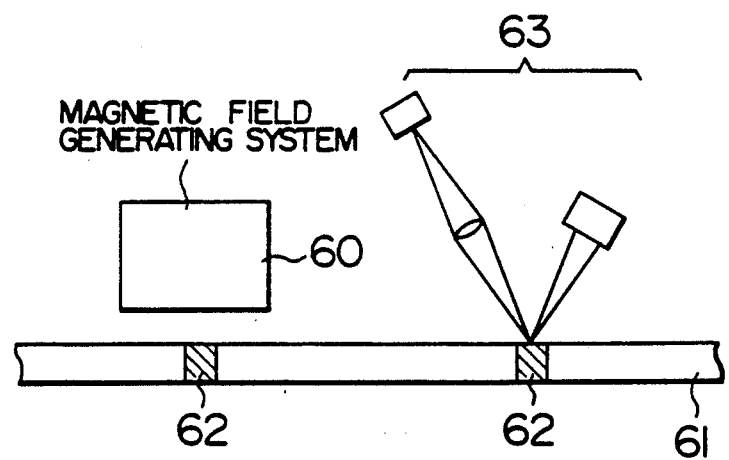
FIG. 6 is a schematic cross section illustrating one method of reproducing information from the magnetically recorded portion according to the invention.

FIG. 6 shows a reproducing method, in which a recorded portion 62 of a magnetic layer 61 that is recorded with information by a magnetic field generating system 60 (equivalent to the one 13 or 13' in embodiments 1 and 2) is sensed by a Kerr effect measuring system 63 that measures laser beam radiation and its reflection characteristics, and then converted into an electric signal.

It is possible to provide an apparatus configuration similar to the conventional one shown in FIG. 2 by raising the temperature of the superconductor 17 of FIGS. 3 or 4 above the superconductivity transition temperature. The temperature of the overall superconductor 17 is therefore raised to render it normally conductive and then the recording is erased by applying a field by means of the magnetic head in a way similar to the conventional one.

Embodiment 4

Figure 7:
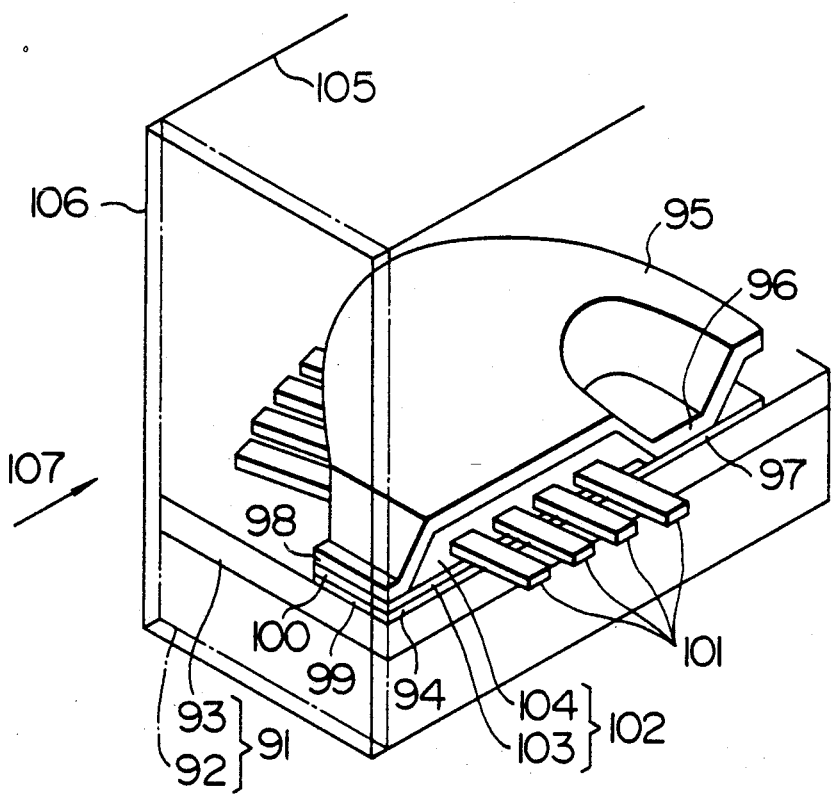
FIG. 7 is a perspective view of one example of the magnetic field generating system (thin-film magnetic head) according to the invention.

FIG. 7 is a perspective view of a thin-film magnetic head used in the magnetic recording apparatus of this invention. Denoted by 91 is a substrate which is comprised of an $AL_2O_3$-TiC system or spinel oxide-carbide system sintered ceramic plate 92 and an $Al_2O_3$ film 93 formed over the surface of the ceramic plate 92 to minimize surface roughness. Designated by 94 is a lower magnetic film made of permalloy which has a specified shape and is formed over the $Al_2O_3$ film 93 of the substrate 91. Reference numeral 95 designates an upper magnetic film formed over the lower magnetic film 94 in such a way that one end 96 of the upper magnetic film 95 is in contact with one end 97 of the lower magnetic film 94 and the other end 98 opposes the other end 99 of the lower magnetic film 94 with a magnetic gap 100 therebetween, thus forming a magnetic circuit that has the magnetic gap 100 at one part thereof. Denoted by 101 are conductive films that pass between the lower magnetic film 94 and the upper magnetic film 95 to form a coil of a specified number of turns which intersects the magnetic circuit. Denoted by 102 is an insulating material that electrically insulates the conductive films 101 from each other, and the conductive films 101 from the lower magnetic film 94 and from the upper magnetic film 95. This insulating material 102 has a first portion 103 made of an inorganic insulating material interposed between the conductive films 101 and the lower magnetic film 94 and extending to the magnetic gap 100, and a second portion 104 made of an organic insulating material interposed between the conductive films 101, between the conductive films 101 and the upper magnetic film 95 and, as required, between the conductive films 101 and the first portion 103. Designated by 105 is a protective member made of an organic or inorganic material. The thin-film magnetic head of such a construction is shielded at its flux generating surfaces by an oxide superconductive material 106. The oxide superconductive material 106 has a two-layer structure prepared by being laminated on a perovskite crystal $SrTiO_3$. This crystal is deposited in advance on the organic material 105 to a thickness of about 0.1 $\mu$m in a direction 107. As for deposition of the superconductive material on the $SrTiO_3$, the $SrTiO_3$ layer is maintained at a temperature of 450° to 650° C. under radiation of laser and an oxide of $YBa_2Cu_3O_7$ is deposited (to a thickness of about 0.5 $\mu$m) by RF magnetron sputtering. The sputtering is carried out in pure $O_2$ atmosphere ($\sim 1 \times 10^{-2}$ Torr) at 100 W input and an oxide of single $YBa_2Cu_4O_x$ is used as a target. The distance between the target and the $SrTiO_3$ is about 70 mm. Raising the temperature of the $SrTiO_3$ portion under the laser radiation is employed in order that the temperature of only the surface portion of $SrTiO_3$ is raised to maintain the inside of the protective member 105° at 350° C. or less for preventing the member 105 from being deformed. The oxide superconductive material 106 prepared in the above manner exhibited superconductivity at a temperature of about 85 to 90K.

Figure 8:
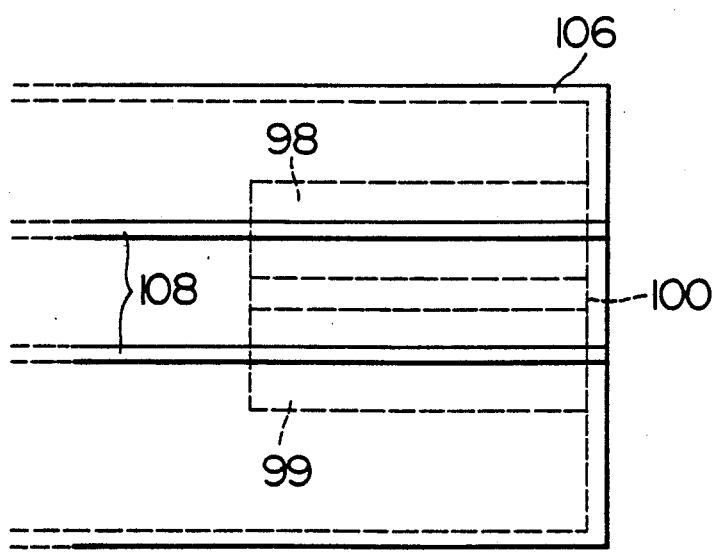
FIGS. 8 and 9 are a plan and a cross section of the magnetic field generating system of FIG. 7 as seen in a specified direction.
Figure 9:
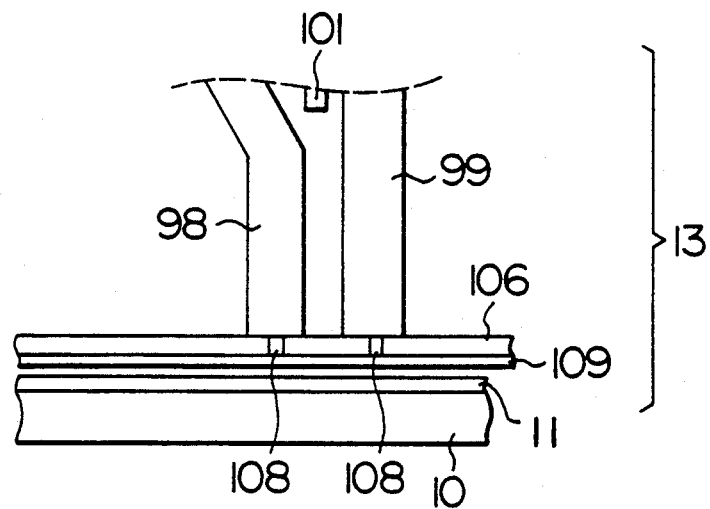

Part of the material 106 is turned into slit-shaped non-superconductive portions 108 which are in register with the magnetic films 98 and 99, as shown in FIG. 8. The non-superconductive portion 108 was formed by radiating oxygen ions at 400 KeV at normal temperature. This non-superconductive portion 108 is so formed as not to be enclosed by the superconductor. In addition, the width of the portion 108 is made to be smaller than the thickness of the magnetic film to ensure a high recording density. It is to be noted that FIG. 8 is a plan viewing FIG. 7 in the direction of arrow 107 in FIG. 7, and FIG. 9 shows a longitudinal sectional view of FIG. 8. When a field generating system 13 is placed above a magnetic film 11 laminated on a non-magnetic substrate 10 and having spontaneous magnetization, flux generated from the field generating system can be restricted by means of the non-superconductive slit portions 108 to achieve magnetic recording at high density. Denoted by 109 is a protective film for the superconductive layer 106.

Figure 10:
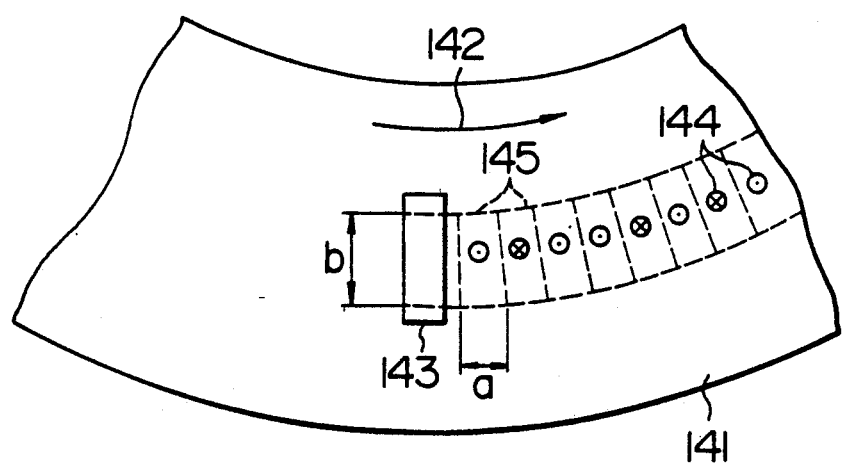
FIG. 10 is a schematic diagram of records on the magnetic disc surface recorded by the magnetic field generating system of this invention.

FIG. 10 is a plan view, as seen from the magnetic head for showing the size of recorded portions on a magnetic disc 141 which are recorded with information by the magnetic field generating system of this invention as shown in FIGS. 7 through 9. Arrow 142 represents the direction of rotation of the disc 141. Designated by 143 is the field generating system and by 144 directions of magnetization. With this embodiment, the width a of a magnetic recording region 145 in the track circumferential direction could be reduced to about one-half to about one-tenth of that of the conventional apparatus depending on the width of the slit 108, thus improving the recording density in the track circumferential direction by two to 10 times.

In the present embodiment, the aforementioned ceramic plate 92 may be prepared by forming a number of thin-film magnetic head elements on a ceramic wafer at a time and dicing the wafer to provide individual magnetic heads. Accordingly, two elements are formed at a 1 mm thick and 3 mm width end surface of the ceramic plate 92 having a width of about 3 mm, a length of about 4 mm and a thickness of about 1 mm. The oxide superconductive layer is formed over the flux generating surfaces, having a surface of 3 mm width and 4 mm length.

The magnetic film of the magnetic head element has a width of about 50 $\mu$m and a thickness of about 10 $\mu$m. The width of the slit 108 in FIG. 8 was set to be about 2 $\mu$m.

For the oxide superconductive material 106, $Tl_{12}Ba_2Ca_2Cu_3O_{10}$ was used in place of the $YBa_2Cu_3O_7$ prepared through RF magnetron sputtering and in either case, the aforementioned high density recording could be achieved by cooling to 77K. For formation of the slit 108, the radiation of an electron beam and of hydrogen ions, argon ions, oxygen ions, Fe ions, Ti ions and Ni ions was used on trial to find that the non-superconductive slit could be prepared under the irradiation of any kind of electromagnetic radiation or ions.

While in the present embodiment the super-conductive layer is directly formed by sputtering, an inverse manner may be employed in which a non-superconductive oxide layer is formed by sputtering and thereafter is irradiated with oxygen ions to make the oxide layer have a stoichiometric composition of such an oxide as shown in Table 1, and the oxygen radiation is performed at a high temperature to make the oxide layer have a predetermined crystal structure, thereby transforming part of the non-superconductive layer superconductive.

According to the magnetic disc of this embodiment, the recording wavelength of submicron is one-tenth or less of the track width and the surface recording density is 100 Mb/in$^2$ or more, thus providing an apparatus capacity of 60 MB or more.

Embodiment 5

Figure 11:
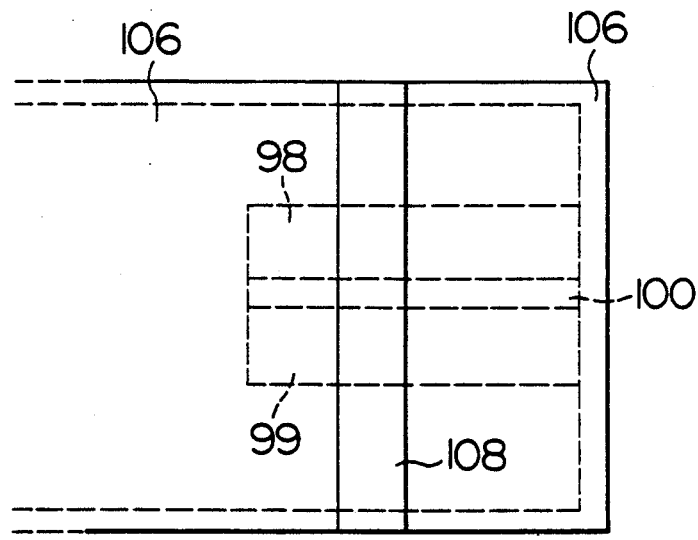
FIG. 11 is a plan view of another example of FIG. 7.

FIG. 11 is a plan view of another example of magnetic head as seen in the direction of arrow 107 in FIG. 7, as in the case of FIG. 8. The magnetic head is covered at its entire flux generating surfaces with the above-mentioned oxide superconductive material 106. At a particular part of the material 106, there is formed a slit-shaped non-superconductive portion 108 which extends crossing the magnetic gap in a direction perpendicular to magnetic poles 98 and 99. The superconductive portion 108 are formed in a similar manner to that of embodiment 4. The width of this non-superconductive portion 108 is set to be smaller than that of the magnetic film 98 or 99. For the same magnetic head element as that of embodiment 4, the width of the slit 108 is set to be about 10 μm. By using the field generating system shown and performing the magnetic recording in a manner similar to the previous method, the size b in the track width direction can be reduced to about one-half to about one-tenth of that of the conventional apparatus. This means the recording density in the track width direction can be improved by two or ten times.

Figure 12:
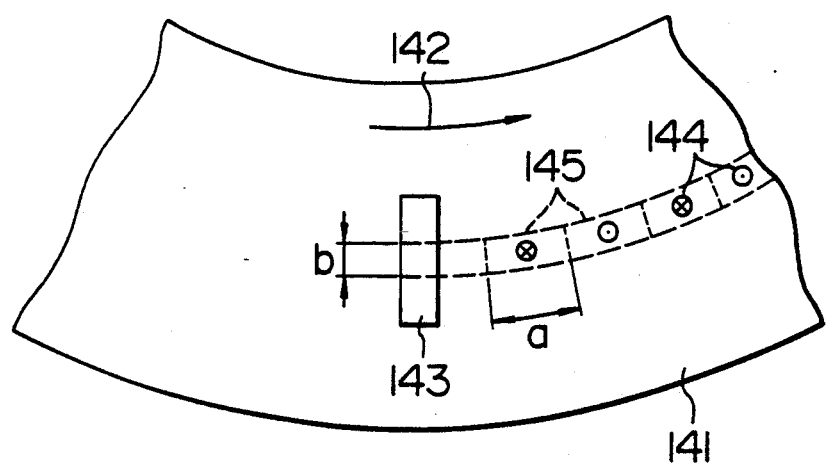
FIG. 12 is a schematic diagram of records on the magnetic disc surface recorded by the magnetic field generating system of FIG. 11.

FIG. 12 is a plan view showing the size, as seen from the magnetic head, of the recorded portions that are recorded by the above method on a magnetic disc 141. Denoted by 142 is a direction of rotation of the disc, by 143 a field generating system and by 144 directions of magnetization. Compared with FIG. 12, the size b of the recorded regions 145 in the track width direction in this embodiment is smaller. Therefore, it is possible to reduce the width of the track.

In this embodiment, similar surface recording density and apparatus capacity to those of embodiment 4 can also be obtained.

Embodiment 6

Figure 13:
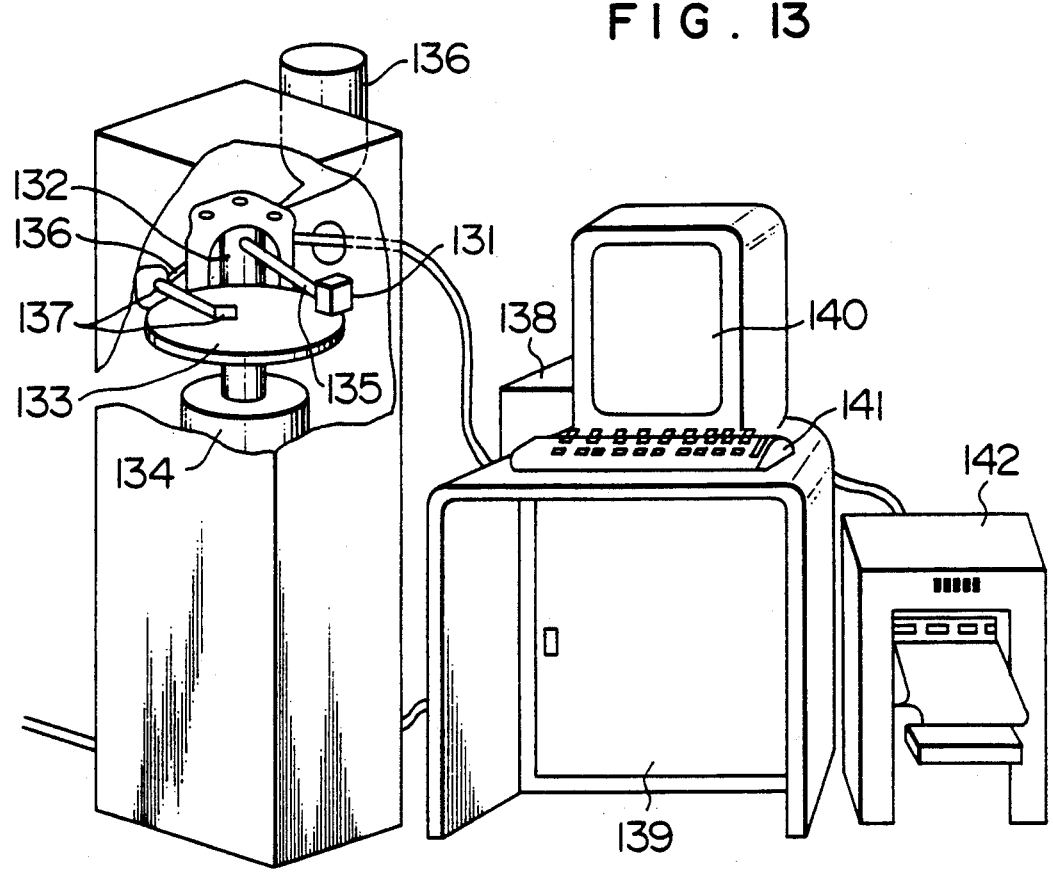
FIG. 13 is an overall view of the magnetic disc apparatus according to the invention.

FIG. 13 is a perspective view showing the overall system of the magnetic disc apparatus of this invention using the above-mentioned thin-film magnetic head of embodiment 4 or 5. A field generating system 131 is driven by a positioning mechanism 132. A magnetic recording disc 133 is driven by a spindle motor 134. The field generating system 131 has the magnetic head covered at its entire flux generating surfaces with about 1 μm thick superconductive layer 106 as shown in FIG. 7. The superconductive layer is formed of an oxide superconductor by sputtering. To render it superconductive, therefore, a heat conducting wire is provided in a driving rod 135 of the positioning mechanism 132 so as to come in contact with the superconductor. The other end of the heat conducting wire is connected to a liquefied nitrogen tank 136 to cool the superconductor through the heat conducting wire. The superconductive film is provided with slits of non-superconductor 108 as shown in FIGS. 8, 9 and 11 to allow magnetic recording in a manner described earlier. Reproduction of the magnetically recorded information can be done by a reproducing system 137 of FIG. 14, which will be described later. The superconductive portion in the reproducing system is also formed of a similar oxide superconductor and is connected to the liquefied nitrogen cooling section 136 through the heat conducting wire so as to be cooled. A write signal fed to the field generating system 131 is supplied from a controller and host system 139 through a signal processing system 138 including amplifier, write compensation circuit and modulator. A read signal obtained by the reproducing system 137 is supplied to the controller and host system 139 through the signal processing system 138 including amplifier, low-pass filter, waveform equalizer, detecting circuit, corner distortion removal circuit, PLL, data discriminator, and demodulator. Rewriting, erasing and outputting of record are carried out by using display 140, keyboard 141 and printer 142 which are interlocked with the host system 139.

Figure 14:
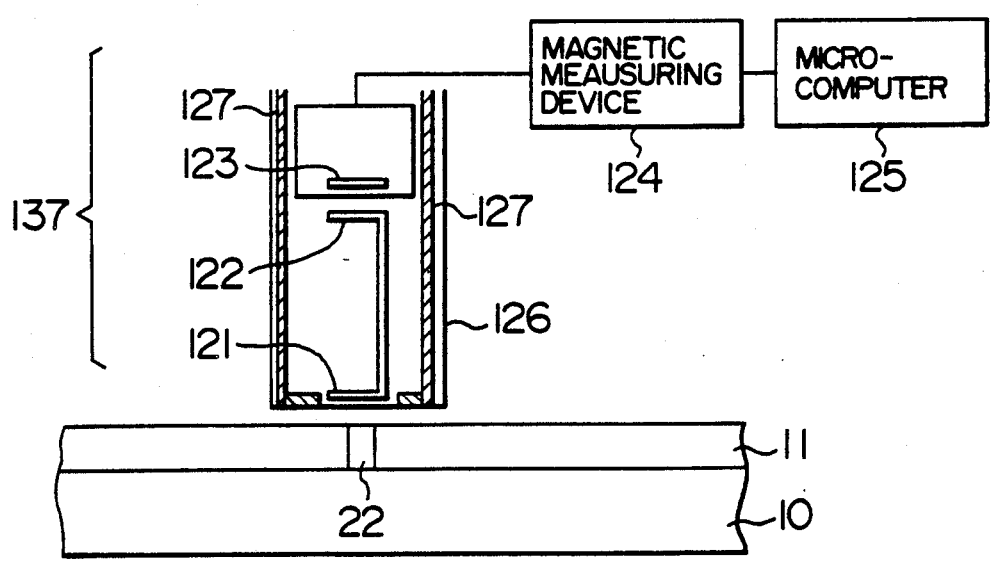
FIG. 14 is a cross section showing one example of the recording system.

FIG. 14 is a cross section showing one example of a system for reproducing the magnetic recorded portion. The magnetic field of a magnetically recorded portion 22 of a magnetic layer 11, which is laminated over a non-magnetic substrate 10 and which has spontaneous magnetization, is detected by a superconductive thin-film pickup coil 121. A field reproducing coil 122 similar to the coil 121 transfers the flux information picked up by the coil 121 to a quantum phase interference metering ring 123 that is formed of a superconductor material and cooperative with the coil 122. The flux information is then quantitatively determined by a magnetic measuring device 124. After this, a microcomputer 125 determines the recording location on the magnetic layer 11 and the presence or absence of recorded information. The superconductive portions 121, 122, 123 of the magnetic reproducing system are installed inside a container 126 provided with magnetic shielding 127. The container 126 serves for both cooling and protecting.

As mentioned above, this embodiment attains higher surface recording density as compared with the conventional thin-film magnetic head.

By surrounding each of the magnetic films 98 and 99 of the magnetic head by a superconductive film having a surface vertical to the sheet of drawing of FIGS. 8 and 9, leakage of flux from the side surface of the magnetic film could be prevented to permit stronger flux to pass through the non-superconductive slit 108. Further, leakage of flux through the magnetic gap is large. Therefore, with a magnetic gap formed of the superconductive material, stronger flux could be passed through the non-superconductive slit 108. Accordingly, in the thin-film magnetic head, a film made of a superconductive material can be formed above the upper magnetic film and below the lower magnetic film and the magnetic gap can also be formed of a superconductive film.

We claim:

1. A magnetic recording apparatus comprising a magnetic head having a recording surface for disposition proximate to a magnetic recording medium, the magnetic head including first and second magnetic members coupled to each other to form a magnetic circuit, the first and second magnetic members terminating at the recording surface and delimiting first and second areas on the recording surface, respectively, for enabling generation of magnetic flux thereat, a superconducting layer being provided between the magnetic recording medium and at least one of the first and second areas of the first and second magnetic members on the recording surface from which the magnetic flux emanates for substantially preventing passage of the magnetic flux therethrough, and a normal conducting region being provided in the superconducting layer so that the passage of the magnetic flux from at least one of the first and second areas of the first and second magnetic members on the recording surface to the magnetic recording medium is limited so as to pass through the normal conducting region in the superconducting layer, the normal conducting region having an area smaller than the at least one of the first and second areas of the first and second magnetic members and being disposed in the superconducting layer so as not to be enclosed by the superconducting layer.

2. A magnetic recording apparatus according to claim 1, wherein the first and second magnetic members terminate at the recording surface with a gap formed therebetween.

3. A magnetic recording apparatus according to claim 2, wherein the first and second magnetic members have first and second end portions terminating at the recording surface, the first and second end portions delimiting the respective first and second areas, the area of the normal conducting region being smaller than the at least one of the first and second areas of the first and second magnetic members so as to enable information recording on the magnetic recording medium with an increased density.

4. A magnetic recording apparatus according to claim 2, wherein the normal conducting region has a shape of a slit in the superconducting layer.

5. A magnetic recording apparatus according to claim 2, wherein the normal conducting region and the superconducting layer are made of substantially the same material.

6. A magnetic recording apparatus according to claim 5, wherein the normal conducting region made of substantially the same material as the superconducting layer is enabled to be in a superconducting state and a normal conducting state, the normal conducting region being responsive to externally applied energy for being placed in the normal conducting state.

7. A magnetic recording apparatus comprising a magnetic head having a recording surface for disposition proximate to a magnetic recording medium, the magnetic head including first and second magnetic members coupled to each other to form a magnetic circuit, the first and second magnetic members terminating at the recording surface with a gap formed therebetween and delimiting first and second areas on the recording surface, respectively, for enabling generation of magnetic flux thereat, a superconducting layer covering at least one of the first and second areas of the first and second magnetic members on the recording surface from which the magnetic flux emanates for substantially preventing passage of the magnetic flux therethrough, the superconducting layer having a region therein transformed from a superconducting state to a normal conducting state so that the passage of the magnetic flux emanating from the at least one of the first and second areas on the recording surface to the magnetic recording medium is limited so as to pass through the region in the normal conducting state, the region in the normal conducting state having an area smaller than the area of the at least one of the first and second areas and being disposed in the superconducting layer so as not to be enclosed by the superconducting layer.

8. A magnetic disc apparatus comprising a magnetic disc provided with a magnetic recording medium, a thin film magnetic head for recording/reproducing information on the magnetic recording medium, and a carriage for moving the magnetic head to a desired position on the magnetic disc, the magnetic head having a recording surface for disposition proximate to the magnetic recording medium and first and second magnetic members coupled to each other to form a magnetic circuit, the first and second magnetic members terminating at the recording surface with a gap formed therebetween and delimiting first and second areas on the recording surface, respectively, for enabling generation of magnetic flux thereat, a superconducting layer covering at least one of the first and second areas of the first and second magnetic members on the recording surface from which the magnetic flux emanates for substantially preventing passage of the magnetic flux therethrough, and a normal conducting region being provided in the superconducting layer so that the passage of the magnetic flux from at least one of the first and second areas on the recording surface to the magnetic recording medium is limited so as to pass through the normal conducting region in the superconducting layer, the normal conducting region having an area smaller than the at least one of the first and second areas of the first and second magnetic members and being disposed in the superconducting layer so as not to be enclosed by the superconducting layer.

9. A magnetic disc apparatus according to claim 8, wherein the area of the normal conducting region enables recording of information with a submicron wavelength on the magnetic recording medium, and further comprising means for controlling the carriage so as to enable the wavelength to be at most one-tenth of a width of tracks on the magnetic recording medium and a surface recording density of the magnetic recording medium being at least 100 Mb/in$^2$, the magnetic disc apparatus having a storage capacity of at least 60 MB.

10. A magnetic head comprising a recording surface for disposition proximate to a magnetic recording medium, first and second magnetic members coupled to each other to form a magnetic circuit, the first and second magnetic members terminating at the recording surface with a gap formed therebetween, the first and second magnetic members delimiting first and second areas on the recording surface, respectively, for enabling generation of magnetic flux thereat, a superconducting layer covering at least one of the first and second areas of the first and second magnetic members on the recording surface from which the magnetic flux emanates for substantially preventing passage of the magnetic flux therethrough, and a normal conducting region provided in the superconducting layer so that the passage of the magnetic flux from at least one of the first and second areas of the first and second magnetic members on the recording surface to the magnetic recording medium is limited so as to pass through the normal conducting region in the superconducting layer, the normal conducting region having an area smaller than the at least one of the first and second areas of the first and second magnetic members and being disposed in the superconducting layer so as not to be enclosed by the superconducting layer.

11. A magnetic head according to claim 10, wherein the first and second magnetic members are first and second magnetic films.

12. A magnetic head according to claim 11, wherein the first magnetic film delimits the first area with a first thickness on the recording surface and the second magnetic film delimits the second area with a second thickness on the recording surface.

13. A magnetic head according to claim 12, wherein the normal conducting region is in a shape of a normal conducting slit provided in the superconducting layer, the normal conducting slit having width smaller than the thickness of the at lest one of the first and second magnetic films on the recording surface and extending in a direction substantially parallel to the gap.

14. A magnetic head according to claim 11, wherein the first and second magnetic films are upper and lower magnetic films.

* * * * *